(12) United States Patent
Wang et al.

(10) Patent No.: US 10,774,474 B2
(45) Date of Patent: Sep. 15, 2020

(54) METHOD FOR TRANSFERRING CARBON NANOTUBE ARRAY

(71) Applicants: Tsinghua University, Beijing (CN); HON HAI PRECISION INDUSTRY CO., LTD., New Taipei (TW)

(72) Inventors: Guang Wang, Beijing (CN); Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 22 days.

(21) Appl. No.: 16/387,158

(22) Filed: Apr. 17, 2019

(65) Prior Publication Data

US 2020/0141062 A1    May 7, 2020

(30) Foreign Application Priority Data

Nov. 1, 2018 (CN) .......................... 2018 1 1298950

(51) Int. Cl.
*D21H 13/50* (2006.01)
*B82Y 30/00* (2011.01)
*B82Y 40/00* (2011.01)

(52) U.S. Cl.
CPC .............. *D21H 13/50* (2013.01); *B82Y 30/00* (2013.01); *B82Y 40/00* (2013.01)

(58) Field of Classification Search
USPC ................................................. 156/247, 249
See application file for complete search history.

(56) References Cited

U.S. PATENT DOCUMENTS

| 9,862,170 | B2 * | 1/2018 | Wei ........................ B32B 37/025 |
| 2009/0237886 | A1 | 9/2009 | Iwai et al. | |
| 2009/0266477 | A1 * | 10/2009 | Weisenberger ....... B32B 37/203 |
| | | | 156/185 |
| 2011/0109006 | A1 | 5/2011 | Zheng et al. |
| 2015/0266737 | A1 * | 9/2015 | Wei ........................ C01B 32/168 |
| | | | 264/164 |

(Continued)

FOREIGN PATENT DOCUMENTS

| CN | 10205424 | 5/2011 |
| TW | 200951210 | 12/2009 |
| TW | 201625481 | 7/2016 |

OTHER PUBLICATIONS

Bradford, Philip David, Advanced Materials Based on Carbon Nanotube Arrays, Yarns and Papers, PhD thesis, Apr. 20, 2010.

*Primary Examiner* — Sing P Chan
(74) *Attorney, Agent, or Firm* — ScienBiziP, P.C.

(57) ABSTRACT

A transfer method for carbon nanotube array is provided. A carbon nanotube array is located on a first substrate. A pressure is applied to the carbon nanotube array to form a carbon nanotube paper. A second substrate with a bonding layer is placed on the carbon nanotube paper, and the bonding layer is located between the second substrate and the carbon nanotube array. The second substrate is peeled off, and the carbon nanotubes of the carbon nanotube paper vertically aligned and form the carbon nanotube array under forces of the first substrate and the second substrate. The carbon nanotubes of the carbon nanotube array are substantially perpendicular to the surface of the second substrate.

19 Claims, 7 Drawing Sheets

(56) References Cited

U.S. PATENT DOCUMENTS

| | | | |
|---|---|---|---|
| 2015/0274518 A1* | 10/2015 | Wei | C01B 32/168 156/80 |
| 2015/0274519 A1* | 10/2015 | Wei | B82Y 40/00 156/80 |
| 2015/0274520 A1* | 10/2015 | Wei | C01B 32/168 156/230 |
| 2015/0291418 A1* | 10/2015 | Wei | C01B 32/16 264/400 |
| 2015/0291419 A1* | 10/2015 | Wei | C01B 32/168 264/28 |
| 2015/0291426 A1* | 10/2015 | Wei | C01B 32/168 264/400 |
| 2015/0291427 A1* | 10/2015 | Wei | C01B 32/168 423/447.1 |
| 2015/0291428 A1* | 10/2015 | Wei | C01B 32/168 156/249 |
| 2015/0360948 A1* | 12/2015 | Wei | B32B 7/12 264/164 |
| 2015/0360949 A1* | 12/2015 | Wei | B29C 65/002 264/28 |
| 2015/0367557 A1* | 12/2015 | Wei | B29C 59/022 428/195.1 |
| 2015/0368105 A1* | 12/2015 | Wei | C01B 32/168 156/80 |
| 2016/0159651 A1 | 6/2016 | Wei et al. | |
| 2018/0354802 A1* | 12/2018 | Liu | B82B 3/0004 |
| 2020/0140278 A1* | 5/2020 | Wei | C01B 32/168 |
| 2020/0141062 A1* | 5/2020 | Wang | D21H 13/50 |
| 2020/0141808 A1* | 5/2020 | Wang | G01J 5/522 |
| 2020/0144014 A1* | 5/2020 | Wei | H01J 9/18 |

* cited by examiner

METHOD FOR TRANSFERRING CARBON NANOTUBE ARRAY

CROSS-REFERENCE TO RELATED APPLICATIONS

This application claims all benefits accruing under 35 U.S.C. § 119 from China Patent Application No. 201811298950.1, filed on Nov. 1, 2018, in the China National Intellectual Property Administration, the contents of which are hereby incorporated by reference. The application is also related to copending applications entitled, "METHOD OF MAKING FIELD EMITTER", Ser. No. 16/393,282 filed Apr. 24, 2019. The application is also related to copending applications entitled, "METHOD FOR MAKING BLACKBODY RADIATION SOURCE", Ser. No. 16/382,402 filed Apr. 12, 2019. The application is also related to copending applications entitled, "METHOD FOR REPAIRING SURFACE OF CARBON NANOTUBE ARRAY", Ser. No. 16/382,413 filed Apr. 12, 2019.

FIELD

The present disclosure relates to a method for transferring carbon nanotube array.

BACKGROUND

Carbon nanotubes (CNTs) are an allotrope of carbon with a cylindrical nanostructure. CNTs exhibit extraordinary strength and unique electrical properties, and are efficient conductors of heat. Carbon nanotube array is formed by a plurality of carbon nanotubes growing in perpendicular with a substrate, and the carbon nanotube array can exert excellent electrical conduction and heat conduction in an axial direction of the carbon nanotube. The carbon nanotube array can be applied to many fields such as field emitters and blackbody sources.

Since a shape of the carbon nanotube array can be damaged easily, the carbon nanotube array is usually fixed on a substrate for storage; the carbon nanotube array is transferred to a target substrate when the array is ready to be used. Conventional method for transferring carbon nanotube array comprises directly bonding the carbon nanotube array on the substrate by a bonding layer on the target substrate, thereby transferring the carbon nanotube array to the target substrate. However, such a method tend to destroy the carbon nanotube array during the transfer process. For example, the carbon nanotubes of carbon nanotube arrays may be tilted, bent, or become entangled during the transfer process, resulting a surface of the carbon nanotube array being uneven and containing defects.

Therefore, there is a room for improvement.

BRIEF DESCRIPTION OF THE DRAWINGS

Implementations of the present technology will now be described, by way of embodiment, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 1:
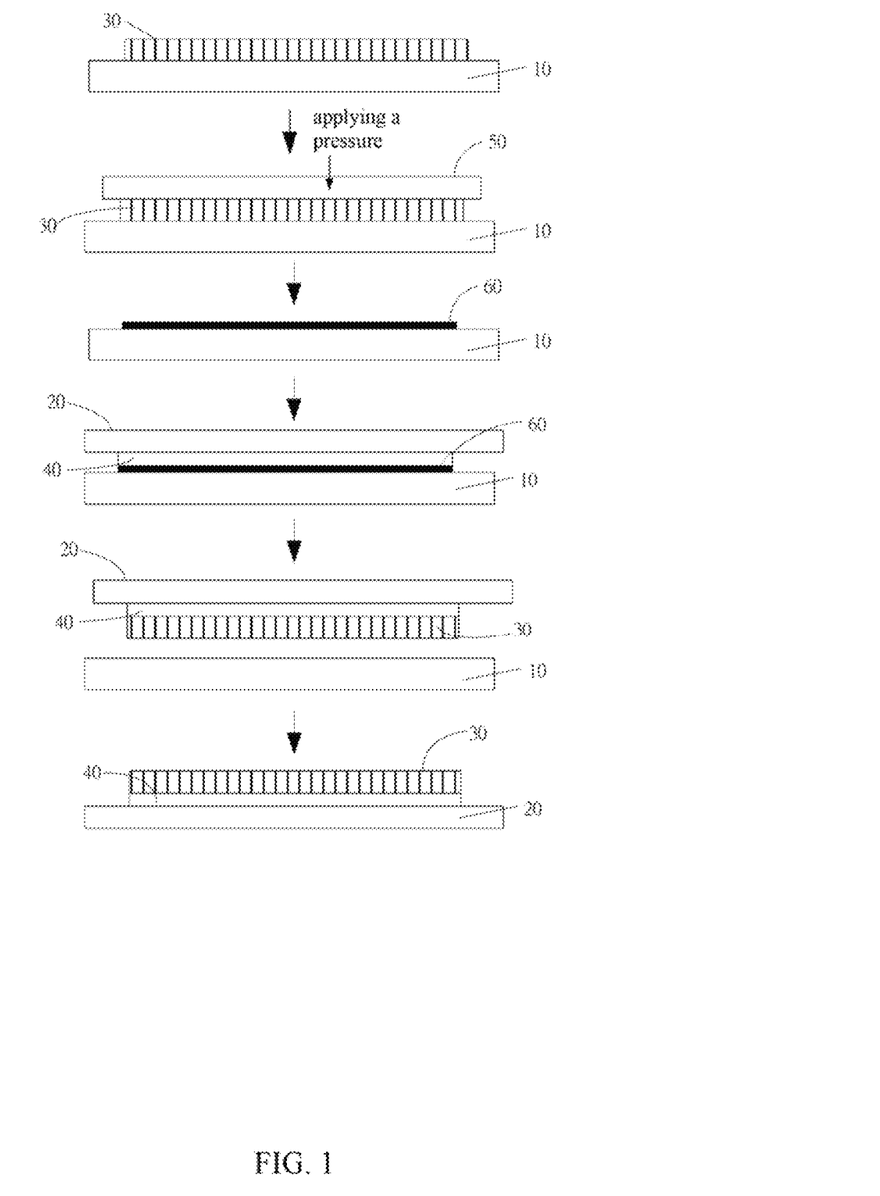
FIG. 1 is a process diagram of one embodiment of a method for transferring carbon nanotube array.
Figure 2:
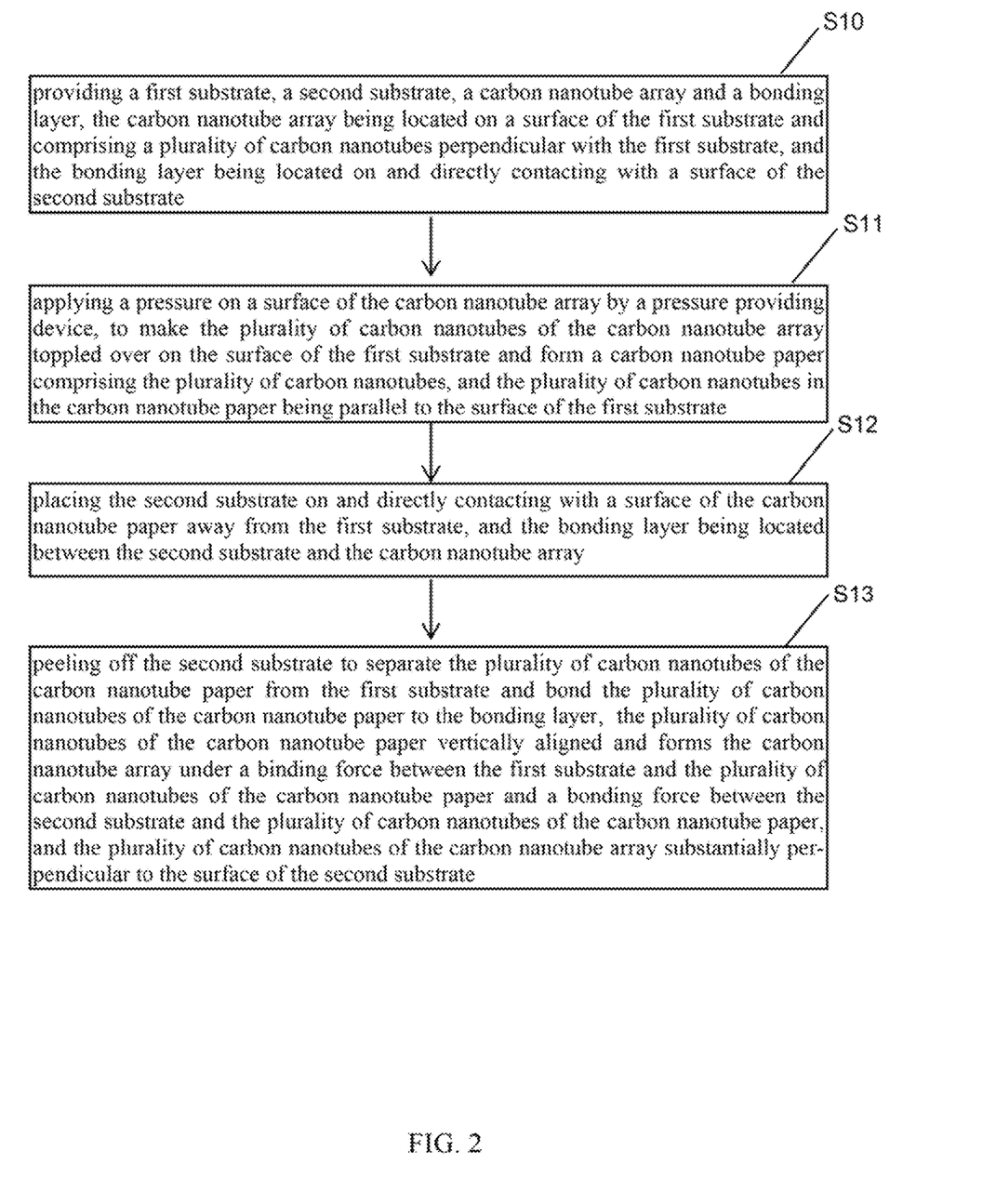
FIG. 2 is a flow diagram of one embodiment of a method for transferring carbon nanotube array.

FIG. 1 and FIG. 2 illustrate a method for transferring carbon nanotube array of one embodiment. The method for transferring carbon nanotube array comprises:

step (S10), providing a first substrate 10, a second substrate 20, a carbon nanotube array 30 and a bonding layer 40, the carbon nanotube array 30 being located on a surface of the first substrate 10 and comprising a plurality of carbon nanotubes perpendicular with the first substrate 10, and the bonding layer 40 being located on and directly contacting with a surface of the second substrate 20;

step (S11), applying a pressure on a surface of the carbon nanotube array 30 by a pressure providing device 50, to make the plurality of carbon nanotubes of the carbon nanotube array 30 toppled over on the surface of the first substrate 10 and form a carbon nanotube paper 60 comprising the plurality of carbon nanotubes, and the plurality of carbon nanotubes in the carbon nanotube paper 60 being parallel to the surface of the first substrate;

step (S12), placing the second substrate 20 on and directly contacting with a surface of the carbon nanotube paper 60 away from the first substrate 10, and the bonding layer 40 being located between the second substrate 20 and the carbon nanotube array 30; and step (S13), peeling off the second substrate 20 to separate the plurality of carbon nanotubes of the carbon nanotube paper 60 from the first substrate 10 and bond the plurality of carbon nanotubes of the carbon nanotube paper 60 to the bonding layer 40, the plurality of carbon nanotubes of the carbon nanotube paper 60 vertically aligned and forms the carbon nanotube array 30 under a binding force between the first substrate 10 and the plurality of carbon nanotubes of the carbon nanotube paper 60 and a bonding force between the second substrate 20 and the plurality of carbon nanotubes of the carbon nanotube paper 60, and the plurality of carbon nanotubes of the carbon nanotube array 30 substantially perpendicular to the surface of the second substrate 20.

In step (S10), the surface of the first substrate 10 is flat and smooth. A material of the first substrate 10 can be flexible or rigid. For example, the material of the first substrate 10 can be tape, metal, glass, plastic, silicon wafer, silicon dioxide sheet, quartz sheet, polymethyl methacrylate (PMMA), or polyethylene terephthalate (PET).

A growing root of the plurality of carbon nanotubes of the carbon nanotube array 30 is adjacent to the first substrate 10, and a growing top of the plurality of carbon nanotubes of the carbon nanotube array 30 is away from the first substrate 10. The carbon nanotube array 30 can be fixed on the first substrate 10 or grown on the first substrate 10 directly. A bonding force between the growing root of the plurality of carbon nanotubes of the carbon nanotube array and the first substrate is less than a bonding force between the growing top of the plurality of carbon nanotubes of the carbon nanotube array and the bonding layer 40. In one embodiment, the carbon nanotube array 30 is fixed on the first substrate 10 by an adhesive, and a bind force between the growing root of the plurality of carbon nanotubes of the carbon nanotube array 30 and the adhesive is less than a bind force between the growing top of the plurality of carbon nanotubes of the carbon nanotube array 30 and the bonding layer 40. In one embodiment, the first substrate 10 is a silicon wafer, and the carbon nanotube array 30 is fixed on the silicon wafer by the adhesive.

A surface formed by the growing root of the plurality of carbon nanotubes of the carbon nanotube array 30 is defined as a first surface, and a surface formed by the growing top of the plurality of carbon nanotubes of the carbon nanotube array 30 is defined as a second surface.

The carbon nanotube array 30 is super-aligned carbon nanotube array. The super-aligned carbon nanotube array comprises a plurality of carbon nanotubes, the plurality of carbon nanotubes are substantially parallel to each other and perpendicular to a surface of the first substrate 10. The super-aligned carbon nanotube array is pure, referring that the super-aligned carbon nanotube array is free with impurities, such as amorphous carbon, residual catalyst metal particles or the like. The plurality of carbon nanotubes of the super-aligned carbon nanotube array is joined with each other by Van der Waals forces to form an array.

A method for making the super-aligned carbon nanotube array can be a chemical vapor deposition (CVD) method, an arc discharge preparation method, or an aerosol preparation method. In one embodiment, the super-aligned carbon nanotube array is directly grown on the first substrate 10 by the chemical vapor deposition (CVD) method. The chemical vapor deposition (CVD) method comprises the steps of (a) providing the first substrate 10. Then (b) forming a catalyst layer on a surface of the first substrate 10, in which a material of the catalyst layer can be selected from the group consisting of iron (Fe), cobalt (Co), nickel (Ni) and alloy of any combination thereof. Step (c) is annealing the substrate with the catalyst layer in air at 700° C. to 900° C. for about 30 minutes to 90 minutes and (d) disposing the first substrate 10 in a reaction chamber. The reaction chamber is heated in protective gas to 500° C.~740° C., and a carbon source gas is introduced into the reaction chamber for about 5 minutes to about 30 minutes. The super-aligned carbon nanotube array is grown from the first substrate 10. A height of the carbon nanotube of the super-aligned carbon nanotube array is ranged from about 200 micrometers to about 650 micrometers. The carbon source gas can be chemically active hydrocarbons, such as acetylene. The protective gas can be nitrogen, ammonia, or an inert gas. Examples of the method of making the super-aligned carbon nanotube array are taught by U.S. Pat. No. 7,045,108 to Jiang et al.

The surface of the second substrate 10 is flat and smooth. A material of the second substrate 20 can be flexible or rigid. For example, the material of the second substrate 10 can be metal, glass, plastic, silicon wafer, silicon dioxide sheet, quartz sheet, polymethyl methacrylate (PMMA), polyethylene terephthalate (PET). A size of the second substrate 20 is not limited. In one embodiment, an area of the surface of the second substrate 20 is larger than or equal to an area of the second surface of the carbon nanotube array 30.

The carbon nanotube array 30 can be transferred from the first substrate 10 to the second substrate 20 when a bonding force between the second substrate 20 and the carbon nanotube array 30 is greater than a bonding force between the first substrate 10 and the carbon nanotube array 30. The van der Waals force between the carbon nanotube array 30 and the second substrate 20 is small; therefore, the bonding force between the carbon nanotube array 30 and the second substrate 20 is improved by forming the bonding layer 40 on the surface of the second substrate 20. The bonding layer 40 can be firmly bonded to the second surface of the carbon nanotube array 30 and the surface of the second substrate 20. A material of the bonding layer 40 can be a traditional binder material. For example, the material of the bonding layer 40 can be polyvinylidene fluoride (PVDF), polyvinylidene fluoride and polytetrafluoroethylene (PTFE). The bonding layer 40 can be solid, liquid or a solid-liquid mixed slurry.

An area of the bonding layer 40 is greater than or equal to the area of the second surface of the carbon nanotube array 30. If a thickness of the bonding layer 40 is too large, such as larger than 50 micrometers, the morphology of the carbon nanotube array 30 may be affected; if a thickness of the bonding layer 40 is too small, such as less than 1 nanometer, the bonding force between the carbon nanotube array 30 and the second substrate 20 may be too small. In one embodiment, the thickness of the bonding layer 40 is from about 1 nanometer to about 50 micrometers. In one embodiment, the thickness of the bonding layer 40 is ranged from about 1 micrometer to about 10 micrometers.

In some embodiment, the second substrate 20 and the bonding layer 40 can form a tape. For example, the second substrate 20 and the bonding layer 40 can form biaxial stretching polypropylene (BOPP) tape, cloth tape, Kraft paper tape, masking tape, fiber tape, polyvinyl chloride (PVC) tape, or polyethylene (PE) tape. In one embodiment, the second substrate 20 and the bonding layer 40 form a PVC tape, a material of the second substrate 20 is PVC, and the bonding layer 40 is polyvinylidene fluoride.

In step (S11), the pressure providing device 50 can be a roller or a plate but not limited to them. When the pressure providing device 50 is the roller, the roller can roll counterclockwise or clockwise on the second surface. When the pressure providing device 50 is the plate, an angle between a direction of applying the pressure and the second surface is from 0 degree to about 90 degrees. In one embodiment, the angle between the direction of applying the pressure and the second surface is greater than or equal to 30 degrees and less than or equal to 60 degrees. The surface of the plate or roller in contact with the carbon nanotube array 30 is a flat surface and is not sticky. A material of the plate or roller is not limited. The material of the plate or roller can be metal such as steel and iron. The material of the plate or roller can also be non-metal such as glass, silicon plate, and diamond. In one embodiment, applying the pressure to the surface of the carbon nanotube array 30 by a glass plate, and the angle between the direction of applying the pressure and the second surface is about 45 degrees.

If the pressure applied to the surface of the carbon nanotube array 30 is too large, the plurality of carbon nanotubes of the carbon nanotube array 30 are easily damaged; if the pressure applied to the surface of the carbon nanotube array 30 is too small, the carbon nanotube paper 60 can not be formed. In one embodiment, the pressure applied to the surface of the carbon nanotube array 30 is about 20 Newton.

Figure 3:
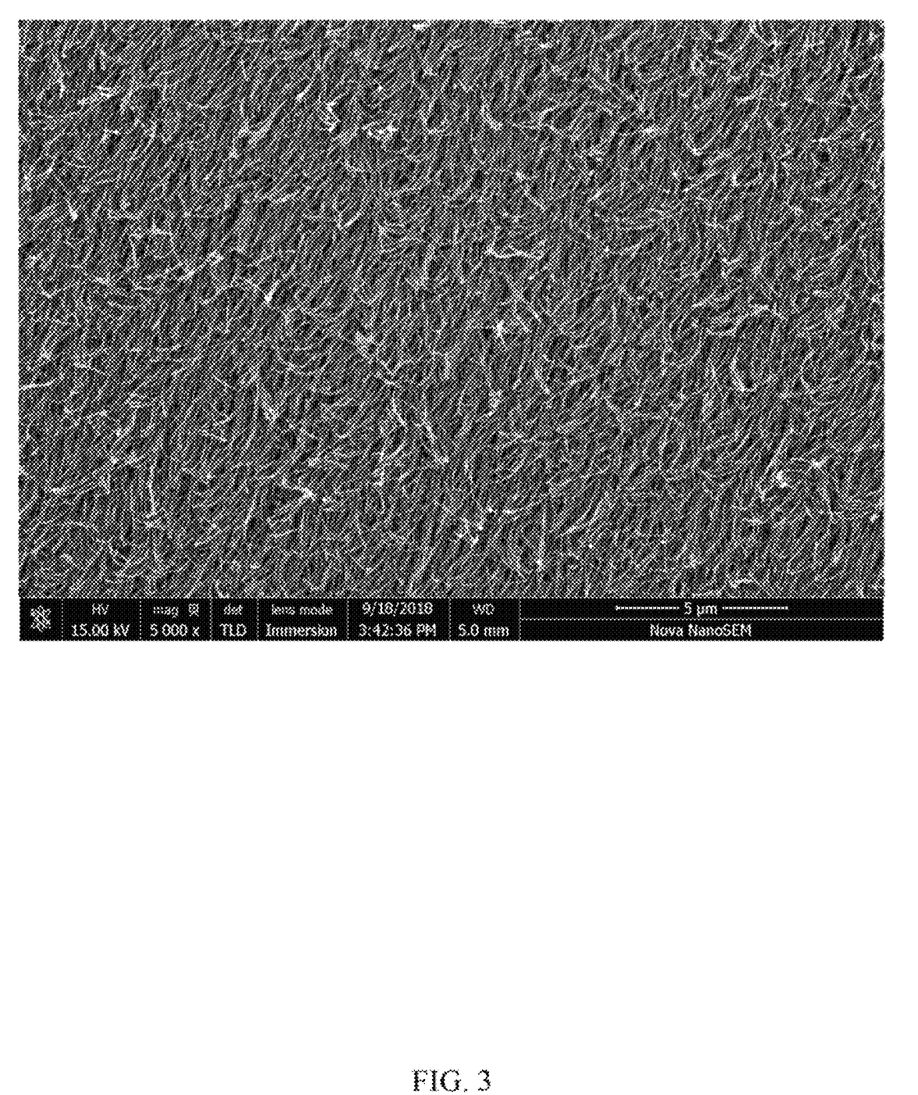
FIG. 3 is a scanning electron microscope (SEM) image of a carbon nanotube paper of one embodiment.

In one embodiment, the pressure providing device 50 applies pressure to the carbon nanotube array 30 in one direction, and the plurality of carbon nanotubes of the carbon nanotube array 30 are toppled over in one direction, therefore, the plurality of carbon nanotubes in the carbon nanotube paper 60 are aligned in the same direction. It is advantageous to vertically bond the plurality of carbon nanotubes in the carbon nanotube paper 60 on the adhesive layer 40 to form the carbon nanotube array 30 in a subsequent step. FIG. 3 shows an electron micrograph of one embodiment of the carbon nanotube paper 60.

In step (S12), after the second substrate 20 is placed on the surface of the carbon nanotube paper 60, the second substrate 20 can be further pressed to better bond one end of the plurality of carbon nanotubes in the carbon nanotube paper 60 to the bonding layer 40.

In step (S13), the binding force of the plurality of carbon nanotubes in the carbon nanotube paper 60 to the second substrate 20 is greater than the binding force of the plurality of carbon nanotubes in the carbon nanotube paper 60 to the first substrate 10. Therefore, during peeling off the second substrate 20, the plurality of carbon nanotubes in the carbon nanotube paper 60 are first pulled up vertically, one end of the plurality of carbon nanotubes is bonded to the bonding layer 40, and the other end of the plurality of carbon nanotubes is bonded to the first substrate 10. After the second substrate 20 is completely peeled off, the plurality of carbon nanotubes in the carbon nanotube paper 60 are separated from the first substrate 10 and vertically bonded to the surface of the bonding layer 40 to form the carbon nanotube array 30, wherein the second surface of the carbon nanotube array 30 is directly in contact with the bonding layer 40. That is, after the carbon nanotube array 30 is transferred to the second substrate 20, the carbon nanotube array 30 stands upside down on the surface of the second substrate 20.

The plurality of carbon nanotubes of the carbon nanotube array 30 substantially perpendicular to the surface of the second substrate 20, meaning that a large number of the carbon nanotubes of the carbon nanotube array 30 are perpendicular to the surface of the second substrate 20, and a minority of carbon nanotubes of the carbon nanotube array 30 may be inclined. However, the number of inclined carbon nanotubes is very small and does not affect the overall oriented alignment of the majority of carbon nanotubes in the carbon nanotube array 30. The inclined carbon nanotubes can be ignored.

Figure 4:
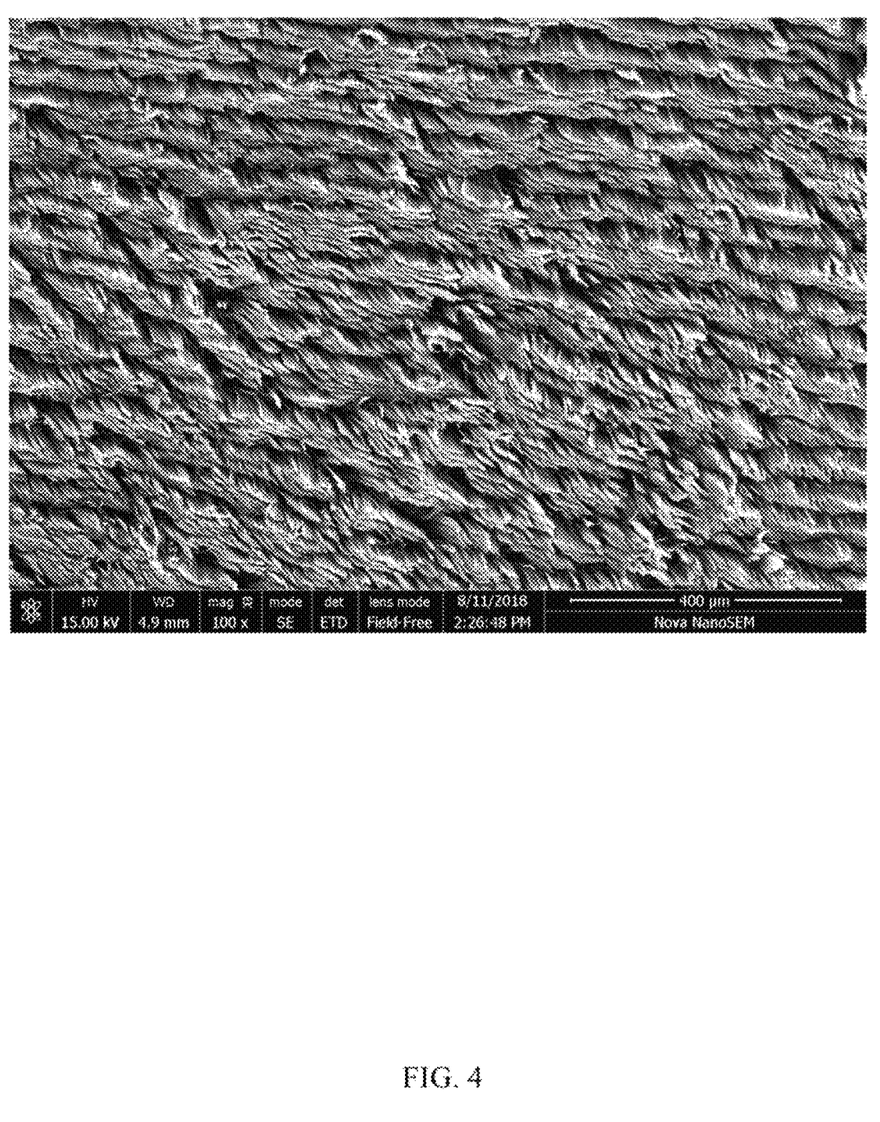
FIG. 4 is an SEM image of the surface of a second substrate after a carbon nanotube array is transferred onto the second substrate.

FIG. 4 shows an electron micrograph of the surface of the second substrate 20 after the carbon nanotube array 30 is transferred onto the second substrate 20. It can be seen that from FIG. 4 the carbon nanotube array 30 is vertically bonded to the surface of the second substrate 20. It can also be seen that the surface of the carbon nanotube array 30 is flat, and the carbon nanotubes in the carbon nanotube array 30 are not bent, tilted, or entangled.

In one embodiment, during peeling off the second substrate 20, a peeling direction of the second substrate 20 is perpendicular to the surface of the first substrate 10, and all the carbon nanotubes in the carbon nanotube paper 60 are simultaneously separated from the first substrate 10.

In one embodiment, the transfer method for carbon nanotube array further comprises annealing the carbon nanotube array 30 before step S10 and after step S11. Annealing the carbon nanotube array 30 can weaken the binding force between the carbon nanotubes in the carbon nanotube array 30 and the first substrate; therefore, during peeling off the second substrate 20, the carbon nanotube array is easily bonded to the bonding layer 40 and transferred to the second substrate 20. In one embodiment, annealing the carbon nanotube array 30 in oxygen for about 9 minutes, a pressure of the oxygen is about 10 torr, and an annealing temperature is about 650° C.

In one embodiment, the transfer method for carbon nanotube array further comprises plasma treating the first surface of the carbon nanotube array 30 after step (S13), to remove impurities on the first surface of the carbon nanotube array 30. In one embodiment, the first substrate 10 is an adhesive tape, after the carbon nanotube array 30 is transferred onto the second substrate 20, there may be some residual adhesive on the first surface of the carbon nanotube array 30, and the residual adhesive can be removed by plasma treatment.

Figure 5:
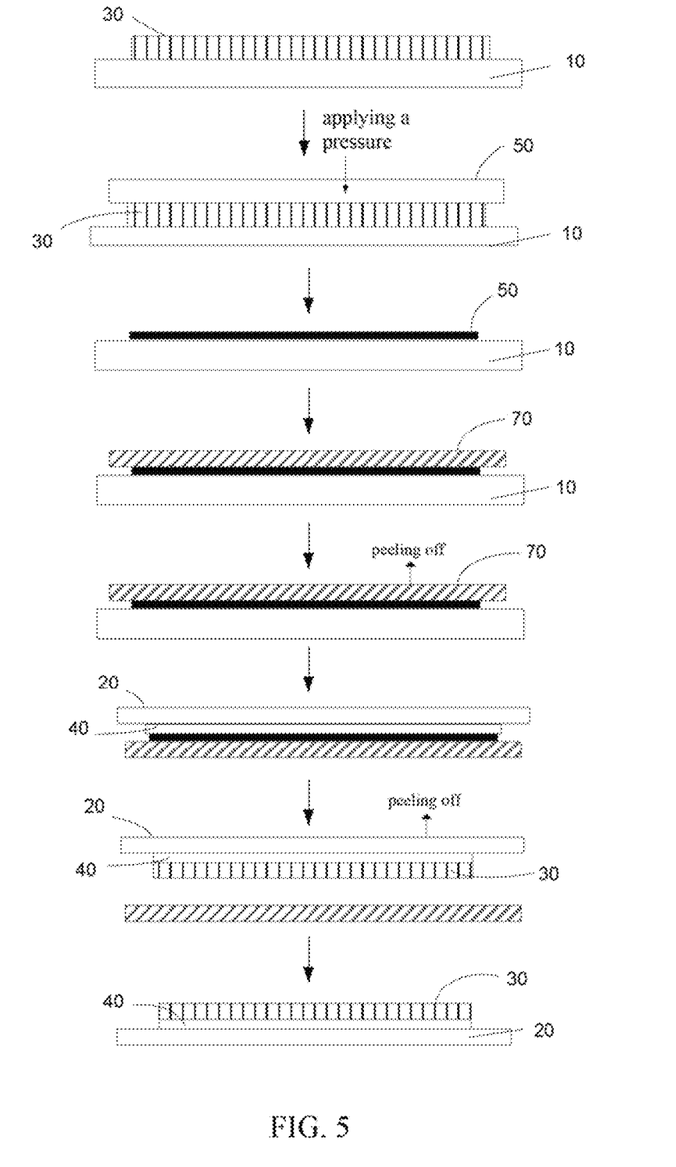
FIG. 5 is a process diagram of one embodiment of a method for transferring carbon nanotube array.
Figure 6:
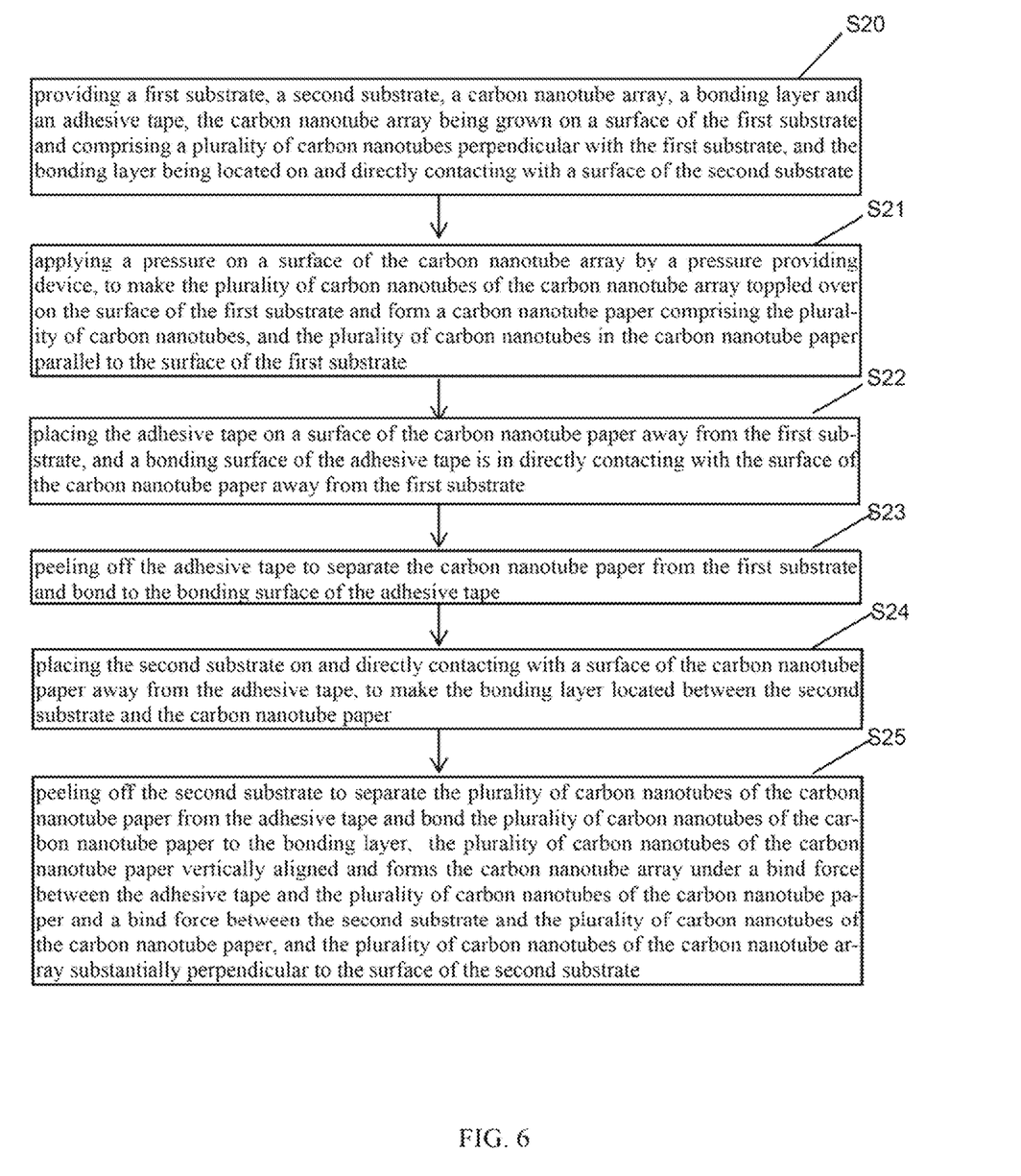
FIG. 6 is a flow diagram of one embodiment of a method for transferring carbon nanotube array.

FIG. 5 and FIG. 6 illustrate a method for transferring carbon nanotube array of another embodiment. The method for transferring carbon nanotube array comprises:

step (S20), providing a first substrate 10, a second substrate 20, a carbon nanotube array 30, a bonding layer 40 and an adhesive tape 70, the carbon nanotube array 30 being grown on a surface of the first substrate 10 and comprising a plurality of carbon nanotubes perpendicular with the first substrate 10, and the bonding layer 40 being located on and directly contacting with a surface of the second substrate 20;

step (S21), applying a pressure on a surface of the carbon nanotube array 30 by a pressure providing device 50, to make the plurality of carbon nanotubes of the carbon nanotube array 30 toppled over on the surface of the first substrate 10 and form a carbon nanotube paper 60 comprising the plurality of carbon nanotubes, and the plurality of carbon nanotubes in the carbon nanotube paper 60 parallel to the surface of the first substrate;

step (S22), placing the adhesive tape 70 on a surface of the carbon nanotube paper 60 away from the first substrate 10, and a bonding surface of the adhesive tape 70 is in directly contacting with the surface of the carbon nanotube paper 60 away from the first substrate 10;

step (S23), peeling off the adhesive tape 70 to separate the carbon nanotube paper 60 from the first substrate 10 and bond to the bonding surface of the adhesive tape 70;

step (S24), placing the second substrate 20 on and directly contacting with a surface of the carbon nanotube paper 60 away from the adhesive tape 70, to make the bonding layer 40 located between the second substrate 20 and the carbon nanotube paper 60; and step (S25), peeling off the second substrate 20 to separate the plurality of carbon nanotubes of the carbon nanotube paper 60 from the adhesive tape 70 and bond the plurality of carbon nanotubes of the carbon nanotube paper 60 to the bonding layer 40, the plurality of carbon nanotubes of the carbon nanotube paper 60 vertically aligned and forms the carbon nanotube array 30 under a bind force between the adhesive tape 70 and the plurality of carbon nanotubes of the carbon nanotube paper 60 and a bind force between the second substrate 20 and the plurality of carbon nanotubes of the carbon nanotube paper 60, and the plurality of carbon nanotubes of the carbon nanotube array 30 substantially perpendicular to the surface of the second substrate 20.

In step (S20), the carbon nanotube array 30 is directly grown on the first substrate 10. The first substrate 10 is a flat structure. A material of the first substrate 10 can be P-type silicon, N-type silicon, silicon oxide with an oxide layer or quartz with an oxide layer. In one embodiment, the first substrate 10 is a silicon wafer.

A surface formed by the growing root of the plurality of carbon nanotubes of the carbon nanotube array 30 is defined as a first surface, and a surface formed by the growing top of the plurality of carbon nanotubes of the carbon nanotube array 30 is defined as a second surface.

A bond force between the second surface of the carbon nanotube array 30 and the adhesive tape 70 is greater than a bond force between the first surface of the carbon nanotube array 30 and the first substrate 10. The bond force between the first surface of the carbon nanotube array 30 and the adhesive tape 70 is less than a bond force between the second surface of the carbon nanotube array 30 and the bonding layer 40. The adhesive tape 70 can be biaxial stretching polypropylene (BOPP) tape, cloth tape, Kraft paper tape, masking tape, fiber tape, polyvinyl chloride (PVC) tape, or polyethylene (PE) tape. Step (S21) is the same as step (S11).

In step (S22), after the adhesive tape 70 is placed on the surface of the carbon nanotube paper 60, the adhesive tape 70 can be further pressed to better bond the carbon nanotube paper 60 to the adhesive tape 70.

In step (S23), the bonding force between the carbon nanotubes in the carbon nanotube paper 60 and the growth substrate is very weak, therefore, the bonding force between the carbon nanotubes in the carbon nanotube paper 60 and the first substrate 10 is much smaller than an adhesion between the carbon nanotubes in the carbon nanotube paper 60 and the adhesive tape 70. During peeling off the adhesive tape 70, the bonding force between the carbon nanotube paper 60 and the first substrate 10 is insufficient to bond one end of the carbon nanotubes in the carbon nanotube paper 60 to the first substrate 10. Therefore, during peeling off the adhesive tape 70, the carbon nanotube paper 60 is entirely transferred to the surface of the adhesive tape 70.

In step (S25), a binding force between the growing root of the plurality of carbon nanotubes of the carbon nanotube array 30 and the bonding layer 40 is less than a binding force between the growing top of the plurality of carbon nanotubes of the carbon nanotube array 30 and the bonding layer 40, therefore, during peeling off the second substrate 20, the carbon nanotubes in the carbon nanotube paper 60 are pulled up vertically, the top of the carbon nanotubes is bonded to the bonding layer 40, and the root of the carbon nanotubes is bonded to the adhesive tape 70. The adhesion between the top of the carbon nanotubes and the bonding layer 40 is greater than the adhesion between the growing root of the carbon nanotubes and the adhesive tape 70, therefore, after the second substrate 20 is completely peeled off, the carbon nanotubes in the carbon nanotube paper 60 are separated from the adhesive tape 70 and vertically bonded to the surface of the second substrate 20, and the top of the carbon nanotube is in contact with the bonding layer 40.

The plurality of carbon nanotubes of the carbon nanotube array 30 substantially perpendicular to the surface of the second substrate 20, meaning that a large number of the carbon nanotubes of the carbon nanotube array 30 are perpendicular to the surface of the second substrate 20, and a minority of carbon nanotubes of the carbon nanotube array 30 may be inclined. However, the number of inclined carbon nanotubes is very small and does not affect the overall oriented alignment of the majority of carbon nanotubes in the carbon nanotube array 30. The inclined carbon nanotubes can be ignored.

In one embodiment, during peeling off the second substrate 20, a peeling direction of the second substrate 20 is perpendicular to the surface of the adhesive tape 70, and all the carbon nanotubes in the carbon nanotube paper 60 are simultaneously separated from the adhesive tape 70.

Figure 7:
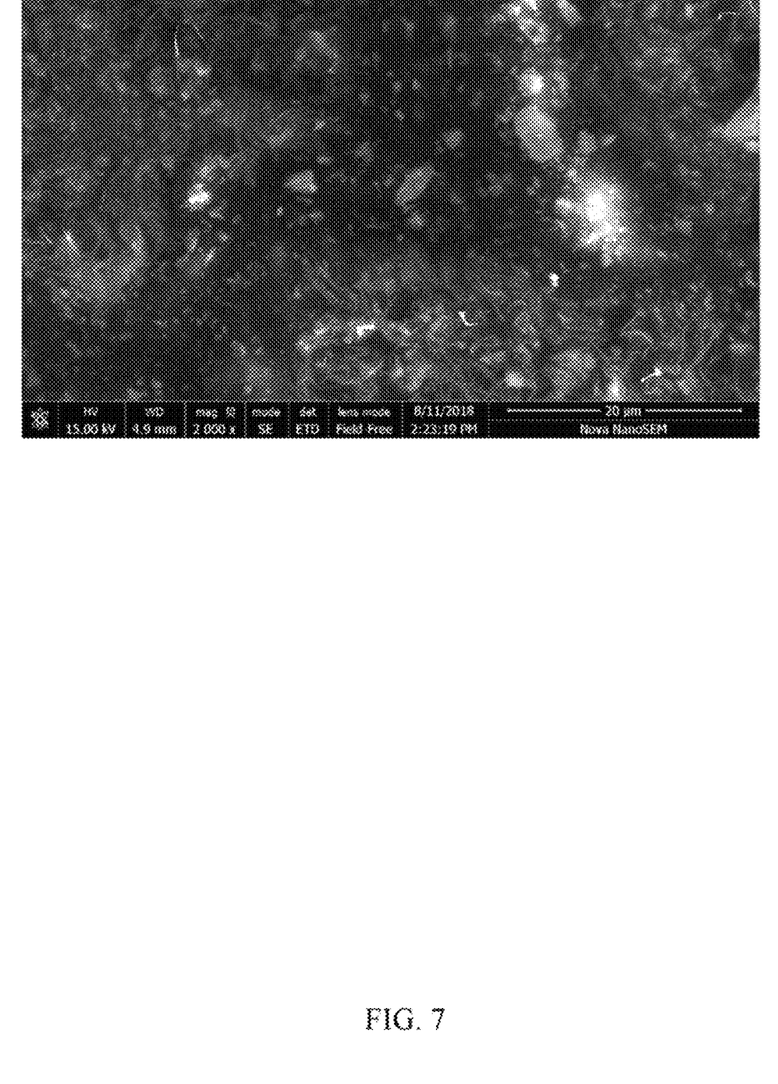
FIG. 7 is an SEM image of a surface of an adhesive tape after a carbon nanotube array is transferred onto a second substrate.

FIG. 7 shows an electron micrograph of the surface of the adhesive tape 70 after the carbon nanotube array 30 is transferred onto the second substrate 20. It can be seen that the surface of the adhesive tape 90 has substantially no residual carbon nanotubes, which illustrates that the carbon nanotube array 30 has all been transferred to the second substrate 20 from the adhesive tape 70.

In one embodiment, the transfer method for carbon nanotube array further comprises plasma treating the first surface of the carbon nanotube array 30 after step (S25), to remove impurities on the first surface of the carbon nanotube array 30.

The transfer method for carbon nanotube array has many advantages. First, the method first presses the carbon nanotube array into carbon nanotube paper and then transfers it. Since the carbon nanotube paper has high mechanical strength and is not easily damaged, the carbon nanotubes will not be tilted, bent, and entangled together during transferring the carbon nanotube array, thereby the surface of the carbon nanotube array is even after being transferred. Second, the transfer method also facilitates storage and transportation of carbon nanotube arrays. Since the carbon nanotube paper has high mechanical strength and is not easily damaged, pressing the carbon nanotube array into carbon nanotube paper before storing and transporting the carbon nanotube array, bonding the carbon nanotube paper by a target substrate with an adhesive layer when use or after reaching the transportation destination, and then peeling the target substrate and transferring the carbon nanotube array to the target substrate. Therefore, the damage to the carbon nanotube array during storage and transportation can be avoided. Further, the first substrate, the carbon nanotube paper and the second substrate are stacked and form a three-layer structure, which can avoid the carbon nanotube paper from bumping, squeezing and contamination during transportation. Third, the transfer method is simple in operation and low in cost.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for transferring carbon nanotube array comprising:
   step (S10), providing a first substrate, a second substrate, a carbon nanotube array and a bonding layer, the carbon nanotube array being located on a surface of the first substrate and comprising a plurality of carbon nanotubes perpendicular with the first substrate, and the bonding layer being located on and directly contacting with a surface of the second substrate;
   step (S11), applying a pressure on a surface of the carbon nanotube array, to make the plurality of carbon nanotubes of the carbon nanotube array toppled over on the surface of the first substrate and form a carbon nanotube paper comprising the plurality of carbon nanotubes, and the plurality of carbon nanotubes in the carbon nanotube paper being parallel to the surface of the first substrate;
   step (S12), placing the second substrate on and directly contacting with a surface of the carbon nanotube paper away from the first substrate, and the bonding layer being located between the second substrate and the carbon nanotube array; and
   step (S13), peeling off the second substrate to separate the plurality of carbon nanotubes of the carbon nanotube paper from the first substrate and bond to the bonding layer, wherein the plurality of carbon nanotubes in the carbon nanotube paper is vertically aligned and forms the carbon nanotube array under a binding force between the first substrate and the plurality of carbon nanotubes in the carbon nanotube paper and a binding force between the second substrate and the plurality of carbon nanotubes in the carbon nanotube paper, and the plurality of carbon nanotubes of the carbon nanotube array substantially perpendicular to the surface of the second substrate.

2. The method of claim 1, wherein a growing root of the plurality of carbon nanotubes of the carbon nanotube array is adjacent to the first substrate, and a growing top of the plurality of carbon nanotubes of the carbon nanotube array is away from the first substrate.

3. The method of claim 2, wherein a bonding force between the growing root of the plurality of carbon nanotubes of the carbon nanotube array and the first substrate is less than a bonding force between the growing top of the plurality of carbon nanotubes of the carbon nanotube array and the bonding layer.

4. The method of claim 2, wherein the carbon nanotube array is fixed on the first substrate by an adhesive, and a bonding force between the growing root of the plurality of carbon nanotubes of the carbon nanotube array and the adhesive is less than a bonding force between the growing top of the plurality of carbon nanotubes of the carbon nanotube array and the bonding layer.

5. The method of claim 1, wherein the carbon nanotube array is grown on the first substrate directly.

6. The method of claim 1, wherein the carbon nanotube array is a super-aligned carbon nanotube array, and the super-aligned carbon nanotube array comprises a plurality of carbon nanotubes substantially parallel to each other and perpendicular to the surface of the first substrate.

7. The method of claim 1, wherein a thickness of the bonding layer is ranged from about 1 nanometer to about 50 micrometers.

8. The method of claim 1, wherein the second substrate and the bonding layer form a tape.

9. The method of claim 8, wherein the second substrate and the bonding layer form a biaxial stretching polypropylene tape, a cloth tape, a Kraft paper tape, a masking tape, a fiber tape, a polyvinyl chloride tape, or a polyethylene tape.

10. The method of claim 1, applying the pressure to the surface of the carbon nanotube array by a roller, wherein the roller rolls counterclockwise or clockwise on a surface of the carbon nanotube array away from the first substrate.

11. The method of claim 1, applying the pressure to the surface of the carbon nanotube array by a plate, wherein an angle between a direction of applying the pressure and a surface of the carbon nanotube array away from the first substrate is from 30 degrees to about 60 degrees.

12. The method of claim 1, applying the pressure to the surface of the carbon nanotube array in one direction, wherein the plurality of carbon nanotubes of the carbon nanotube array are toppled over in one direction, the plurality of carbon nanotubes in the carbon nanotube paper are aligned in one direction.

13. The method of claim 1, wherein a peeling direction of the second substrate is perpendicular to the surface of the first substrate, and all carbon nanotubes in the carbon nanotube paper are simultaneously separated from the first substrate.

14. The method of claim 1, further comprising a step of annealing the carbon nanotube array before step S10 and after step S11.

15. The method of claim 1, further comprising a step of plasma treating a surface of the carbon nanotube array away from the second substrate after step (S13).

16. A method for transferring carbon nanotube array comprising:
   step (S20), providing a first substrate, a second substrate, a carbon nanotube array, a bonding layer and an adhesive tape, the carbon nanotube array being grown on a surface of the first substrate directly and comprising a plurality of carbon nanotubes perpendicular with the first substrate, and the bonding layer being located on and directly contacting with a surface of the second substrate;
   step (S21), applying a pressure on a surface of the carbon nanotube array, to make the plurality of carbon nanotubes of the carbon nanotube array toppled over on the surface of the first substrate and form a carbon nanotube paper comprising the plurality of carbon nanotubes, and the plurality of carbon nanotubes in the carbon nanotube paper being parallel to the surface of the first substrate;
   step (S22), placing the adhesive tape on a surface of the carbon nanotube paper away from the first substrate, and a bonding surface of the adhesive tape is in directly contacting with the surface of the carbon nanotube paper away from the first substrate;
   step (S23), peeling off the adhesive tape to separate the carbon nanotube paper from the first substrate and bonded to the bonding surface of the adhesive tape;
   step (S24), placing the second substrate on and directly contacting with a surface of the carbon nanotube paper away from the adhesive tape, to make the bonding layer located between the second substrate and the carbon nanotube paper; and step (S25), peeling off the second substrate to separate the plurality of carbon nanotubes in the carbon nanotube paper from the adhesive tape and bond to the bonding layer, the plurality of carbon nanotubes in the carbon nanotube paper vertically aligned and forms the carbon nanotube array under a force between the adhesive tape and the plurality of carbon nanotubes in the carbon nanotube paper and a force between the second substrate and the plurality of carbon nanotubes in the carbon nanotube paper, and the plurality of carbon nanotubes of the carbon nanotube array substantially perpendicular to the surface of the second substrate.

17. The method of claim 16, further comprising plasma treating a surface of the carbon nanotube array away from the second substrate after step (S25).

18. The method of claim 16, wherein a peeling direction of the second substrate is perpendicular to the adhesive tape, and all the carbon nanotubes in the carbon nanotube paper are simultaneously separated from the adhesive tape.

19. The method of claim 16, wherein the carbon nanotube array is a super-aligned carbon nanotube array, and the super-aligned carbon nanotube array comprises a plurality of carbon nanotubes substantially parallel to each other and perpendicular to the surface of the first substrate.

* * * * *